May 13, 1930.  A. GRØNNING  1,758,284
FILTER FOR LIQUIDS
Filed Sept. 13, 1927
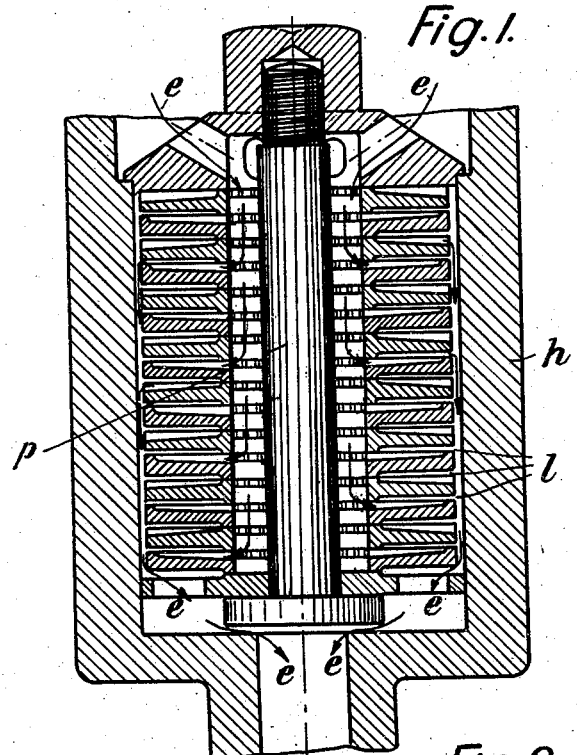
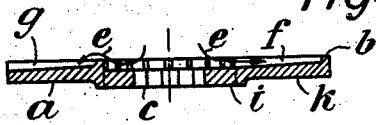
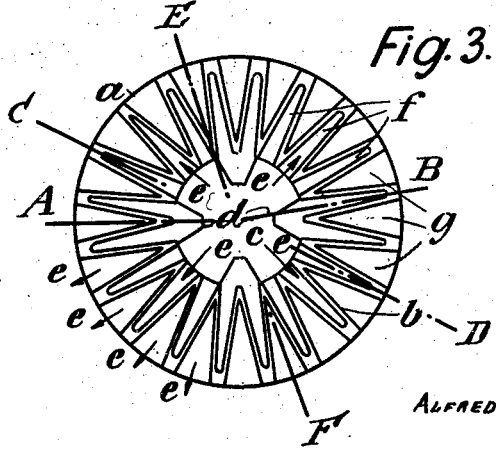
ALFRED GRØNNING
INVENTOR:
By
Attorney.

Patented May 13, 1930

1,758,284

UNITED STATES PATENT OFFICE

ALFRED GRØNNING, OF HELLERUP, NEAR COPENHAGEN, DENMARK

FILTER FOR LIQUIDS

Application filed September 13, 1927, Serial No. 219,334, and in Denmark July 25, 1927.

This invention relates to a filter intended for cleansing liquids of mechanical impurities contained therein. In order that the filter may be capable of cleansing smaller quantities of liquid by clearing the liquid of impurities of minimal size, it has been designed in such a manner that narrow slits are provided between suitably shaped bodies, through which slits the liquid is forced to flow and the width of which slits is smaller than the width or size of the smallest impurities contained in the liquid, the said impurities being thereby retained and separated from the liquid when the latter enters and passes through the slits. It is very important that the slits formed between the filter bodies only extend a short distance in the direction of flow of the liquid, as the friction produced during the passage or flow then becomes of minor importance, and hollow spaces or channels must be arranged contiguously to the slits, capable of receiving the impurities filtered off, as well as of distributing the liquid in such a way that the impurities are evenly deposited. Further the filter must be easy to cleanse, and accordingly the filter, which is normally enclosed in a filter housing, must be capable of being removed from the said housing in an easy manner, at the same time carrying the impurities retained by the filter along with it, and finally the individual filter bodies constituting the filter must be easily separable or detachable.

All the above-mentioned demands are complied with by the filter which is the object of the present invention. This filter consists of a number of filter bodies in the shape of plates or discs, which are stacked on top of each other and clamped together, thus forming the said filter slits between the surfaces of the plates or discs. These filter plates or discs are provided, on one or both sides, with two systems of channels, one of which systems is connected with the inlet for the liquid, for instance through one or more substantially centrally arranged holes in the plates or discs, while the other system is connected with the outlet opening for the liquid, for instance through the space surrounding the circumferences of the plates or discs.

These systems of channels may be arranged in several different ways. Each plate may, for instance, be provided on its two sides with channels belonging to each separate system, or the plates or discs may be provided with channels of one and the other system alternately; channels belonging to both systems may also be arranged on the same side of a disc, and various other combinations may be employed.

The portion of the surface of the discs forming the slits when the discs are stacked on top of each other may be flat, cone-shaped, spherically shaped or have any other suitable shape. The channels are made in these portions of the surfaces as a sunk-in impression. If both systems of channels are to be found on one side of a plate, a raised cam or ridge is formed by the impression, because the systems of channels must be separated from each other, for instance in the form of a zig zag line or band separating the two systems. The bottoms of the channels may be flat, rounded or sloping in relation to the raised portion of the disc, or have any other suitable shape. The channels may be rectilinear, bent or curved in any suitable way, and they may be arranged radially, as chords, tangents or in any other way.

Besides complying with all demands as to suitability of form and shape the invention is of special advantage in that the filter plates or discs are easily and cheaply produced and may be made with the great accuracy necessary for plates or discs serving to form slits of very small width, and of equal size all over, as far as this is possible.

The discs or trays may be made from rolled sheets, from which they are stamped or cut in the shape of blanks which are afterwards pressed into the desired shape by means of a suitable press, such as a toggle press, a screw press, a hydraulic press or the like, in a way similar to that employed in making coins. The impression in the plate or disc is made by using a matrice or die for the punch of the press. The impression may be made by a single pressing operation, but may suitably also be made by a number of pres ·ng operations, the one succeeding the other and different dies being used so that the plates or discs appear in their final shape or form after the last pressing. If desired the treatment of the plates may be concluded by the plates being machined, or ground on a grinding machine, or by being ground by hand employing grinding powder, or the raised portion of the impression may be treated in any other similar way.

When the filter discs are stacked the slits employed in the filtration of the liquid are formed, either by the raised impression being provided with still further raised portions or areas or by means of specially arranged portions or ridges or the like independent of the raised impression, or by means of thin sheets or pieces of metal, paper, fibre or the like inserted between the discs, of a thickness corresponding to the desired width of the slits. As already mentioned the impression on the plates or discs may be confined to one side of the discs or may exist on both sides. Preferably the systems of channels may be impressed on one side of the plate or disc, and the impression (ridges, raised areas or the like) determining the width of the slits on the other.

The plates or discs are clamped together by means of one or more throughgoing bolts, or in any other way.

A constructional form of the invention is illustrated in the drawing, in which

Fig. 1 shows a part sectional longitudinal view of the filter, the sections through the filter discs being alternately on the lines C—D and E—F in Fig. 3, Fig. 2 a transverse sectional view on line A—B in Fig. 3 of one of the filter discs, and Fig. 3 the filter disc as seen from above.

The upturned surface of the filter discs $a$ is provided with a zigzag-shaped, raised cam or ridge $b$, and a central hole $c$ is provided, permitting the passage of the fluid through the filter which consists of a suitable number of discs or plates $a$. The discs are clamped together by means of a bolt $p$ extending through the holes $c$, and are supported in relation to the said bolt $p$ by means of the projections $d$ extending from the circumferences of the holes $c$. In the surface of the discs the two channel systems $f$ and $g$ are arranged, separated by the cam or ridge $b$. $f$ is the inner channel system, to which the unfiltered liquid flows after having entered through the hole $c$, the arrows $e$ indicating the direction of flow of the liquid. The impurities are retained in the inner channel system, while the filtered liquid flows over the cam or ridge $b$ into the outer channel system $g$, which conveys the liquid to the filter housing $h$. The bottom side of the filter disc is provided (Fig. 2) with an annular projection $i$ which projects from the otherwise flat bottom side $k$ a distance corresponding to the width $l$ of the slits. The bottom of the channels $f$ rises slightly from the centre of the disc outwards, while the bottom of the channels $g$ sinks in the outward direction in a corresponding manner, by which it is obtained that the cross sectional area of the channels increases or decreases in a suitable manner in accordance with the quantity of liquid flowing through any cross sectional area. This ensures an even utilization of the whole operative filter area, and correspondingly even distribution of the deposited impurities.

The invention is not bound to the constructional form above described and set forth which, as already mentioned, should be taken as an example only, and it may be carried out in several different ways without thereby departing from the principles of the invention.

I claim:—

1. Apparatus of the kind described for straining or filtering liquids, consisting of a plurality of superposed or juxtaposed plates having raised portions which are shaped to form a narrow passage between adjacent plates over the said projecting or raised portions, the said passage being substantially zig-zag which connects a series of inlet channels with a series of outlet channels for the liquid between the raised portions.

2. In a filtering apparatus of the character described, the combination of a plurality of slightly spaced superimposed annular plates, each thereof having its upper surface provided with a zig-zag ridge extending completely around the plate, means for clamping the plates together, and a casing in which the plates are suspended.

3. In a filtering apparatus of the character described, the combination of a plurality of slightly spaced superimposed annular plates, each thereof having its upper surface provided with a zig-zag ridge extending completely around the plate, and a downwardly projecting flange on the under surface adjacent the inner periphery, means for clamping the plates together, and a casing in which the plates are suspended.

4. In a filtering apparatus of the character described, the combination of a plurality of slightly spaced superimposed annular plates, each thereof having its upper surface provided with a zig-zag ridge extending completely around the plate and a downwardly projecting flange on the under surface adjacent the inner periphery, the bottom surfaces of the spaces on the inside of the ridges being inclined downwardly toward the inner periphery to form the inlets and the bottom surfaces of the spaces on the outside of the ridges being inclined downwardly toward the outer periphery of the plate to form the outlets, means for clamping the plates together, and a casing in which the plates are suspended.

5. A filtering element comprising an annular plate having a zig-zag ridge extending completely around one surface from the inner periphery to the outer periphery, spacing flange on the opposite surface adjacent the inner periphery, and projections on its inner periphery to center the plate.

In testimony whereof I affix my signature.

ALFRED GRØNNING.